Patented Oct. 20, 1953

2,656,298

UNITED STATES PATENT OFFICE 2,656,298

THERAPEUTIC PRODUCT

Leo Loewe, Brooklyn, N. Y., assignor to The Jacques Loewe Research Foundation, New York, N. Y., a corporation of New York No Drawing. Application November 10, 1948, Serial No. 59,420

6 Claims. (Cl. 167—55)

1

This invention relates in general to therapeutic compositions and articles and in particular to compositions and articles for oral administration and to methods of making the same.

It is considered highly desirable to administer certain therapeutic agents in such a manner as to afford a sustained level of the drug in the body fluids over a substantial period of time. This is particularly necessary with anti-biotics such as penicillin and the like. Heretofore, attempts have been made to administer anti-biotics by injection and by continuous drip methods. These methods have many disadvantages, inter alia, they are annoying to the patient, require skilled personnel for administration and result in a temporary excess level followed by a precipitous drop so that they have to be repeated at frequent intervals.

However, it has not been possible, heretofore, to give these classes of drugs by mouth for the reason that most of the anti-biotics are acid sensitive and many are degraded in the peptic regions of the digestive tract. It is essential that the drug pass unchanged and unabsorbed through the acid and peptic regions and that it be delivered to the alkaline regions of the small intestine in substantial quantities.

Accordingly, it is a general object of the invention to provide for the oral administration of therapeutic agents in such a manner that the agents will be carried through the acid regions of the digestive tract without being adversely affected and arrive in the alkaline regions of the intestinal tract before their activity takes place.

It is another object to provide, as an article of manufacture, a shaped therapeutic object comprising an acid-sensitive therapeutic substance combined with an enteric material which enables the substance to be administered orally and to be carrier through the stomach and into the alkaline regions of the intestinal tract without acid or peptic degradation.

It is another object to provide a composition comprising an acid-sensitive therapeutic agent and a substance combined therewith for protecting the agent against acid attack thereby enabling the composition to be administered by mouth, and protect the agent until it arrives in the alkaline region of the intestinal tract.

Other objects of the invention will in part be obvious and will in part appear hereinafter.

According to the present invention there is provided a therapeutic composition for oral administration comprising an acid-sensitive therapeutic substance combined with an amount of an ion-exchange resin of the anionic type sufficient to protect the therapeutic substance against the acid of the stomach so that it arrives in the alkaline region of the intestinal tract before its activity takes place. The invention also includes an article, in the form of a pill, tablet, pearl, or capsule comprising an acid sensitive therapeutic substance enclosed in a protective enteric covering comprising anionic ion-exchange resin. The invention further contemplates the use in the composition and article of a material adapted to retard the diffusion of the therapeutic substance into the body fluids for example, a gel-forming colloid, in particular, a water-insoluble protein, and the invention includes a process for forming compositions and articles comprising a gel containing the therapeutic agent, the protein and the ion-exchange resin.

It has been found that acid-sensitive therapeutic substances as a class are protected in passing through the stomach when they are combined with, as by mixing or coating, an anion exchange resin which resins, as a class, exhibit the property of absorbing acids, such as the hydrochloric acid in the stomach and thus prevent the acid from damaging the therapeutic substances. For the anion exchange resin there may be used any natural, modified-natural or synthetic resinous material which absorbs acids from solutions. By way of illustration but not by way of limiting the invention the following anion-exchange material will be given as examples: anion-exchange resins comprising a condensate of aniline and formaldehyde such as the anion "De-acidite" brand resins made by The Permutit Company of New York, the amine-formaldehyde resins such as the anion "Amberlite IR-4B" brand resins sold by Resinous Products and Chemical Co., of Philadelphia, Pa., the "Duolite" brand resins sold by Chemical Process Co., of San Francisco, and the "Ionac" brand resins of American Cyanamide Co. also anion-exchange resins formed from condensing an amine with a monosaccharide (an aldehyde), and guanidine with formaldehyde, and the reaction product of poly halo-derivatives of certain hydrocarbons as described in French Patent 820,969 and British Patent 489,173; and such natural-modified materials as asphalt treated with a strong alkali to render it anion-exchanging.

Any acid-sensitive therapeutic substance, as a class, may be protected, such, for example, as penicillin salts, aureomycin, chloromycetin, streptomycin, bacitracin, subtilin, polymyxin, dihydrostreptomycin; also other acid-sensitive medicinals such as the hormones, in particular, the estrogens, insulin, adrenalin, heparin and the like. The anion-exchanger is particularly effective for protecting the salts of penicillin such, for example, as the sodium, alumnium, iron, magnesium and cobalt salts, also acid penicillin itself, because the anion-exchanger also protects the agent while passing through the peptic regions.

The therapeutic agent is preferably used in the form of a gel, the gelling agent comprising any suitable colloid, such for example, as natural gums, agar, starch and the like, but in the preferred form, the gel is formed using a protein colloid, such as the animal and vegetable proteins as a class, for example, gelatin, casein, soya bean protein, yeast protein, blood proteins, albumin and the like. The agent is preferably dispersed in the colloidal solution and then dehydrated to form a gel. The function of the protein is to retard the diffusion of the agent in the body fluids and thus prolong the drug level over a substantial period of time.

Optional ingredients and elements of the composition and article are: (1) inert carriers which may function to assist in forming pills and tablets of the composition or as bulking materials. For this ingredient there is preferably employed therapeutic-inert materials as a class, such, for example, as talc, starch, cellulose, and the alkali-soluble, water-insoluble cellulose ethers. (2) Agents to prevent or retard gastric rebound, such for example as the higher fatty acids as a class, such, for example, as stearic acid, palmitic acid, abietic acid, lauric acid and the like. When the agent is present in a shaped form, such as a pill, tablet, pearl or capsule, the outer surface may comprise a flavoring or sweetening material to improve its receptivity and retention, such, for example, as sugar, caramel, honey, saccharine and the like.

Without limiting the invention, but for purposes of illustration, there will be given a detailed description of a preferred method of preparing the composition and article of the invention:

5 parts of gelatin, U. S. P. grade, either positive or negative, is dissolved in 15 parts of water at from 40° to 100° C., the pH adjusted to a value of from 5 to 7, and 10 parts of crystalline sodium penicillin added with stirring. The mixture is cooled and then dehydrated in a convenient manner, for example, by (1) freezing out the excess water, (2) by vacuum distillation or (3) by azeotropic distillation, using an inert organic solvent such as benzene in 125 parts. The dried gel thus obtained is a stable intimate combination of the protein and therapeutic agent.

Next, the gel is treated to reduce or eliminate the swelling of the gelatin, the process preferred being one of formalizing the gelatine but other insolubilizing processes may be employed. The dried gel containing the therapeutic agent is dispersed in a liquid in which it is insoluble, such for example as acetone, glycol, ethyl acetate and treated with formaldehyde: for example using an acetone-formalin solution containing 25 cc. of acetone and 1 cc. of formaldehyde for every gram of gelatin. Or, formaldehyde gas may be bubbled through the acetone dispersion at a temperature from 0° to 25° C. The treatment with formaline or formaldehyde should continue for several hours, for example, 18 hours. The formaldehyde appears to react with the amino groups of the protein molecule to form a new compound of reduced water-swelling characteristics. Thus the drug particles are enmeshed in a gel of hardened, water-insoluble protein-formaldehyde complex. The acetone is decanted and the product washed in acetone, the excess acetone being evaporated to obtain an air-dried powder. To convert the sodium penicillin to the salt of another metal, such as iron or aluminum, the gel, before or after formalizing, is treated with the soluble salt of the other metal in aqueous solution, for example, with the chemical equivalent of ferric chloride in water under an atmosphere of nitrogen, the product being dried in nitrogen without heating, as by vacuum distillation.

The dried gel of formalized protein containing the drug is preferably powdered or comminuted to particles having a size from 200 mesh to 10 mesh. It has been found that this particle size is desirable for obtaining a high level in the blood. Conventional dosages of the therapeutic agent may be employed, for example from 100,000 to 300,000 Oxford units of sodium penicillin or 1 to 2 grams of streptomycin, etc. The composition may be taken by mouth without skilled supervision; it is non-toxic and causes no pain or local gastric disturbances.

In one embodiment of the invention, there is provided a shaped medicinal article comprising an inner mass comprising an acid-sensitive therapeutic substance and having an enteric covering enclosing the mass and comprising an anion exchange resin. The article may have the physical form of a pill, tablet, pearl or capsule or any other convenient shape for oral use. By way of illustration but not by way of limiting the invention the following examples will be given of different ways of making the article:

1. In this example, the drug, for example, sodium penicillin is mixed with a viscous paste, such as starch or a water-soluble cellulose ether, or glue, which serves as a binder and shaped into the form of a pill, tablet, lozenge or the like. The shaped mass is then covered with a layer of the anion-exchange resin, by one of the methods to be hereinafter described.

2. In this example, the drug, for example, streptomycin is dispersed in a protein gel and formalized, and dried in the form of pearls, the pearls then being covered with a layer comprising the anion-exchange material, by a method described below.

3. In this example, the drug, for example, a hormone is mixed with a binder as in Example 1, and shaped into an article such as a pill or tablet which is then enclosed in two coverings, one comprising the anion-exchange material and the other the formalized protein, these coatings being applied in either order on the article. Since the function of the protein gel is to protect the drug from too-rapid diffusion it is immaterial whether the protein is in the outer or inner coating.

4. In this example, the drug, for example, adrenalin, is shaped into the form of a pill, tablet or pearl, by mixing it with a binder as described in Example 1. The shaped mass is then coated to completely enclose it in a composition comprising a protein gel having dispersed therein particles of an anion-exchange resin, for example, an amine-formaldehyde resin capable of absorbing acids.

5. In this example, the drug, for example, any acid-sensitive therapeutic substance in mass or in powder form is enclosed in a capsule, the walls of which comprise an anion-exchange resin.

From the above examples, it will be apparent that the shaping of the therapeutic substance may be facilitated by mixing it with a binder, preferably, a water-soluble tacky agent such as an aqueous paste of starch, casein, glue, water-soluble cellulose ethers and water soluble gums, such as gum tragacanth, the mass being shaped and the water removed without substantial heating.

In the above examples, the anion-exchange resin may be formed into the enclosing covering in several ways, for example: (1) by dispersing particles of the solid anion-exchange resin in a water-insoluble binder, such for example as the formalized protein, applying the viscous paste to the article and removing the water without substantial heating; (2) by dissolving the resin in a suitable solvent thereof as known to those skilled in the art, using a high percentage to form a viscous lacquer, coating the mass containing the drug and evaporating the solvent; (3) by forming the anion-exchange resin into an organo-sol dispersion, which is paste-like in viscosity, coating the drug mass and fluxing the coating to form the resin into a continuous film; (4) by comminuting the anion-exchange resin, for example, an amine-formaldehyde resin, mixing the particles with particles of a thermoplastic urea-formaldehyde molding powder, and forming two thin wafer-like preforms by compression, disposing the drug mass between them and subjecting the assembly to heat and pressure to mold the resin mixture around the drug mass; (5) molding or casting a capsule of the anion-exchange resin alone or in admixture with film-forming agents such as thermoplastic cellulose derivatives and thermoplastic resins.

The following table shows the penicillin blood levels with time after administration of the present composition having the ingredients indicated:

*Penicillin blood levels in units per ML of serum, following a single oral dose of 300,000 Oxford units of a gel containing penicillin, "Deacidite" anion exchange resin and formalized gelatin:*

| Subject | Hours after Administration | | | | | |
|---|---|---|---|---|---|---|
| | 2 | 4 | 6 | 8 | 10 | 12 |
| A | 0.75 | 0.08 | 0.05 | 0.05 | 0.03 | |
| B | 1.5 | 0.50 | 0.08 | 0.05 | 0.03 | |
| C | 3.75 | 1.50 | 0.75 | 0.50 | 0.15 | 0.08 |
| D | 0.75 | 0.75 | 0.50 | 0.08 | 0.04 | |
| E | 1.00 | 0.15 | 0.08 | 0.05 | 0.03 | 0.03 |
| F | 0.50 | 0.30 | 0.08 | 0.05 | 0.03 | |
| G | 1.50 | 0.75 | 0.08 | 0.04 | 0.04 | 0.03 |
| H | 0.40 | 0.30 | 0.15 | 0.10 | 0.08 | |

(Employing *Streptococcus pyrogenes* C203 as test organism.)

The above table clearly illustrates that the penicillin is delivered into the blood at a high level and that after an initial drop an effective level is maintained for a number of hours. When the same composition is used without the incorporation of the anion exchange resin, the penicillin is converted by the acid in the stomach into the free penicillin acid which is rapidly excreted and does not reach the small intestines for absorption.

It is to be understood that various changes may be made in the proportion of the ingredients in the composition and in the shape and form of the article without transcending the scope of the invention.

The present invention provides many advantages over prior practices. Since the drug is administered by mouth, the dosage can be standardized and varied as desired. Because the drug is protected by the enteric anion exchange resin it arrives in the alkaline regions of the intestine in its original chemical form and without substantial loss in quantity. Oral administration is simple, effective and painless and requires no special technique or personnel for administration.

I claim:

1. A product comprising a therapeutic agent of the type which is impaired in effectiveness by passage through the peptic region, said agent being enclosed within an enteric covering including an anion exchange resin and a formalized protein.

2. A product comprising a salt of penicillin enclosed within an enteric covering including an anion exchange resin and a formalized protein.

3. A product comprising sodium penicillin enclosed within an enteric covering comprising an anion exchange resin and a formalized protein.

4. A product comprising an estrogen enclosed within an enteric covering comprising an anion exchange resin and a formalized protein.

5. A product comprising heparin enclosed within an enteric covering comprising an anion exchange resin and a formalized protein.

6. A product comprising a powdered mixture of sodium penicillin and formalized gelatin enclosed within an enteric covering including an anion exchange resin and an outer formalized gelatin capsule.

LEO LOEWE.

References Cited in the file of this patent

UNITED STATES PATENTS

| Number | Name | Date |
|---|---|---|
| 2,390,088 | Fox | Dec. 4, 1945 |
| 2,438,106 | Alburn | Mar. 23, 1948 |
| 2,449,039 | Libby | Sept. 7, 1948 |

OTHER REFERENCES

Journal American Medical Association, September 29, 1945, pages 331 to 332.

Journal American Medical Association, October 6, 1945, pages 425 to 432.

Gastroenterology, April 1946, pages 315 to 323.

American Prof. Pharm., July 1945, pages 613 to 615.